US011075414B2

(12) United States Patent
Yokotsuji et al.

(10) Patent No.: US 11,075,414 B2
(45) Date of Patent: Jul. 27, 2021

(54) BATTERY COOLING CONTROL DEVICE

(71) Applicant: MITSUBISHI JIDOSHA KOGYO KABUSHIKI KAISHA, Tokyo (JP)

(72) Inventors: Hokuto Yokotsuji, Tokyo (JP); Katsuyoshi Muramatsu, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 18 days.

(21) Appl. No.: 16/551,012

(22) Filed: Aug. 26, 2019

(65) Prior Publication Data

US 2020/0067151 A1 Feb. 27, 2020

(30) Foreign Application Priority Data

Aug. 27, 2018 (JP) .............................. JP2018-158470

(51) Int. Cl.
| | |
|---|---|
| *B60W 20/15* | (2016.01) |
| *H01M 10/613* | (2014.01) |
| *B60W 20/40* | (2016.01) |
| *B60W 20/13* | (2016.01) |
| *H01M 50/581* | (2021.01) |

(52) U.S. Cl.
CPC .......... *H01M 10/613* (2015.04); *B60W 20/13* (2016.01); *B60W 20/15* (2016.01); *B60W 20/40* (2013.01); *H01M 50/581* (2021.01)

(58) Field of Classification Search
CPC ... B60K 2001/005; B60K 6/28; B60W 10/26; B60W 10/28; H01M 10/613
See application file for complete search history.

(56) References Cited

U.S. PATENT DOCUMENTS

| | | | | |
|---|---|---|---|---|
| 8,909,397 | B2 * | 12/2014 | Aridome | B60L 3/0046 701/22 |
| 9,381,913 | B2 * | 7/2016 | Masuda | B60L 3/0038 |
| 9,409,564 | B2 * | 8/2016 | Shigyo | B60W 10/26 |
| 9,421,846 | B2 * | 8/2016 | Ono | B60W 10/26 |

(Continued)

FOREIGN PATENT DOCUMENTS

| | | |
|---|---|---|
| JP | 2005-204481 A | 7/2005 |
| JP | 2011-219005 A | 11/2011 |

OTHER PUBLICATIONS

Extended European Search Report for European Application No. 19193465.2, dated Jan. 22, 2020.

*Primary Examiner* — Jeffrey J Restifo

(74) *Attorney, Agent, or Firm* — Birch, Stewart, Kolasch & Birch, LLP

(57) ABSTRACT

A battery cooling control device includes a power storage device management portion that detects a temperature of a power storage device, an electronic control portion that changes over a traveling mode of a vehicle between an EV traveling mode and an HEV traveling mode, and based on a detection result of the power storage device management portion, outputs a cooling start instruction and a cooling stop instruction, and a cooling system that starts cooling the power storage device in response to a receiving of the cooling start instruction and stop cooling the power storage device in response to a receiving of the cooling stop instruction. The electronic control portion changes set values of the cooling start temperature and the cooling stop temperature in accordance with whether the traveling mode is the EV traveling mode or the HEV traveling mode.

8 Claims, 3 Drawing Sheets

(56) References Cited

U.S. PATENT DOCUMENTS

| | | | | |
|---|---|---|---|---|
| 9,522,672 B2* | 12/2016 | Okamoto | ............... | B60W 10/26 |
| 9,527,507 B2* | 12/2016 | Oba | ......................... | B60K 6/50 |
| 9,561,704 B2* | 2/2017 | Enomoto | ........... | B60H 1/32284 |
| 9,878,594 B2* | 1/2018 | Enomoto | ........... | B60H 1/00878 |
| 9,878,703 B2* | 1/2018 | Kava | ..................... | B60W 10/30 |
| 10,029,557 B2* | 7/2018 | Han | ......................... | F01P 3/20 |
| 10,160,307 B2* | 12/2018 | Yim | ...................... | B60W 10/26 |
| 10,328,789 B2* | 6/2019 | Han | ........................ | B60K 11/02 |
| 10,358,046 B2* | 7/2019 | Myers | ..................... | B60K 11/02 |
| 10,392,018 B1* | 8/2019 | Rhodes | ................. | B60H 1/3208 |
| 10,486,542 B2* | 11/2019 | Wang | ..................... | G01R 31/374 |
| 10,578,005 B2* | 3/2020 | Mitteer | ................... | F01P 7/165 |
| 10,700,389 B2* | 6/2020 | Honkura | ............... | B60W 10/26 |
| 10,759,303 B2* | 9/2020 | Duan | .................. | B60L 15/2045 |
| 10,800,398 B2* | 10/2020 | Duan | ................... | B60W 20/12 |
| 2016/0185250 A1 | 6/2016 | Izumi | | |

* cited by examiner

BATTERY COOLING CONTROL DEVICE

CROSS REFERENCE TO RELATED APPLICATIONS

This application is based on Japanese Patent Application (No. 2018-158470) filed on Aug. 27, 2018, the contents of which are incorporated herein by reference.

TECHNICAL FIELD

1. Field of the Invention

The present invention relates to a battery cooling control device provided in an electrically driven vehicle having an engine and a motor.

2. Description of the Related Art

In a typical electrically driven vehicle (such as a hybrid vehicle or a plug-in hybrid vehicle), a battery for supplying electric power to a motor is provided, and a cooling device for cooling the battery is further provided in order to suppress the battery from reaching a high temperature to thereby deteriorate.

For example, JP-A-2005-204481 and JP-A-2011-219005 disclose techniques for enhancing cooling power with which the battery is cooled by a cooling device in a traveling mode where much power consumption is used for traveling in an electrically driven vehicle which can select a traveling mode from two kinds of traveling modes.

When cooling the battery is started by the cooling device, power consumption increases, that is, electricity efficiency (a traveling distance per unit capacity of electric power energy sources, the electric power energy sources are, for example, various power sources, batteries, etc.) deteriorates, so that an EV traveling distance (a distance with which a vehicle can travel with a full charged battery) decreases. Therefore, suppressing the deterioration of the battery and increasing the EV traveling distance cannot be attained compatibly. For example, when the traveling mode in which much power consumption is used for traveling is selected in JP-A-2005-204481 or JP-A-2011-219005, electric power consumed by the cooling device also increases in order to enhance the cooling power of the cooling device. Thus, the EV traveling distance is reduced on a large scale.

SUMMARY

The present invention has been developed in consideration of the aforementioned technical problem. An object of the present invention is to provide a battery cooling control device capable of compatibly attaining suppressing deterioration of a battery and increasing an EV traveling distance.

In order to attain the foregoing object, a battery cooling control device according to a first configuration of the invention is a battery cooling control device which is provided in a vehicle including an internal combustion engine, a rotary electric machine for outputting traveling power, and a power storage device that supplies and receives electric power to and from the rotary electric machine, the battery cooling control device cooling the power storage device and including:

a power storage device management portion configured to detect a temperature of the power storage device;

an electronic control portion configured to change over a traveling mode of the vehicle between an EV traveling mode where the vehicle travels while stopping the internal combustion engine and operating the rotary electric machine and an HEV traveling mode where the vehicle travels while operating the internal combustion engine and the rotary electric machine, and based on a detection result of the power storage device management portion, output a cooling start instruction when the temperature of the power storage device reaches a predetermined cooling start temperature, and a cooling stop instruction when the temperature of the power storage device reaches a predetermined cooling stop temperature; and a cooling system configured to start cooling the power storage device in response to a receiving of the cooling start instruction and stop cooling the power storage device in response to a receiving of the cooling stop instruction, and the electronic control portion is configured to change set values of the cooling start temperature and the cooling stop temperature in accordance with whether the traveling mode is the EV traveling mode or the HEV traveling mode.

In order to attain the foregoing object, a battery cooling control device according to a second configuration of the invention is the battery cooling control device according to the aforementioned first configuration, the electronic control portion is configured to set the cooling start temperature in the EV traveling mode to be higher than the cooling start temperature in the HEV traveling mode, and set the cooling stop temperature in the EV traveling mode to be higher than or equal to the cooling stop temperature in the HEV traveling mode.

In order to attain the foregoing object, a battery cooling control device according to a third configuration of the invention is the battery cooling control device according to the aforementioned first or second configuration, the HEV traveling mode includes a parallel traveling mode where the vehicle travels using power of the internal combustion engine and power of the rotary electric machine, and a series traveling mode where the vehicle travels while operating the rotary electric machine using electric power generated by the internal combustion engine, and the electronic control portion is configured to change over the traveling mode to the parallel traveling mode and the series traveling mode.

In order to attain the foregoing object, a battery cooling control device according to a fourth configuration of the invention is the battery cooling control device according to the aforementioned third configuration, the electronic control portion is configured to set the cooling start temperature in the series traveling mode to be higher than or equal to the cooling start temperature in the parallel traveling mode, and sets the cooling stop temperature in the series traveling mode to be higher than or equal to the cooling stop temperature in the parallel traveling mode.

In order to attain the foregoing object, a battery cooling control device according to a fifth configuration of the invention is the battery cooling control device according to any one of the aforementioned second to fourth configurations, the power storage device management portion is configured to detect a charging rate of the power storage device, and in the EV traveling mode, based on a detection result of the power storage device management portion, the electronic control portion is configured to set the cooling start temperature in a case where the charging rate is higher than a predetermined value to be higher than the cooling start temperature in a case where the charging rate is equal to or lower than the predetermined value, and set the cooling stop temperature in the case where the charging rate is higher than the predetermined value to be higher than or equal to the cooling stop temperature in the case where the charging rate is equal to or lower than the predetermined value.

In order to attain the foregoing object, a battery cooling control device according to a sixth configuration of the invention is the battery cooling control device according to any one of the aforementioned second to fourth configurations, the power storage device management portion is configured to detect a charging rate of the power storage device, and in the series traveling mode, based on a detection result of the power storage device management portion, the electronic control portion is configured to set the cooling start temperature in a case where the charging rate is higher than a predetermined value to be higher than the cooling start temperature in a case where the charging rate is equal to or lower than the predetermined value, and set the cooling stop temperature in the case where the charging rate is higher than the predetermined value to be higher than or equal to the cooling stop temperature in the case where the charging rate is equal to or lower than the predetermined value.

In order to attain the foregoing object, a battery cooling control device according to a seventh configuration of the invention is the battery cooling control device according to any one of the aforementioned second to fourth configurations, the power storage device management portion is configured to detect a charging rate of the power storage device, and in the parallel traveling mode, based on a detection result of the power storage device management portion, the electronic control portion is configured to set the cooling start temperature in a case where the charging rate is higher than a predetermined value to be higher than the cooling start temperature in a case where the charging rate is equal to or lower than the predetermined value, and set the cooling stop temperature in the case where the charging rate is higher than the predetermined value to be higher than or equal to the cooling stop temperature in the case where the charging rate is equal to or lower than the predetermined value.

In order to attain the foregoing object, a battery cooling control device according to an eighth configuration of the invention is the battery cooling control device according to the aforementioned fifth configuration, the electronic control portion is configured to set the cooling start temperature in the EV traveling mode in the case where the charging rate is equal to or lower than the predetermined value to be higher than or equal to the cooling start temperature in the HEV traveling mode, and set the cooling stop temperature in the EV traveling mode in the case where the charging rate is equal to or lower than the predetermined value to be higher than or equal to the cooling stop temperature in the HEV traveling mode.

The battery cooling control device according to the invention can compatibly attain suppressing deterioration of a battery and increasing an EV traveling distance.

DESCRIPTION OF EMBODIMENTS

A battery cooling control device according to the present invention will be described below with reference to the drawings illustrating Embodiments.

Embodiment 1

Figure 1:
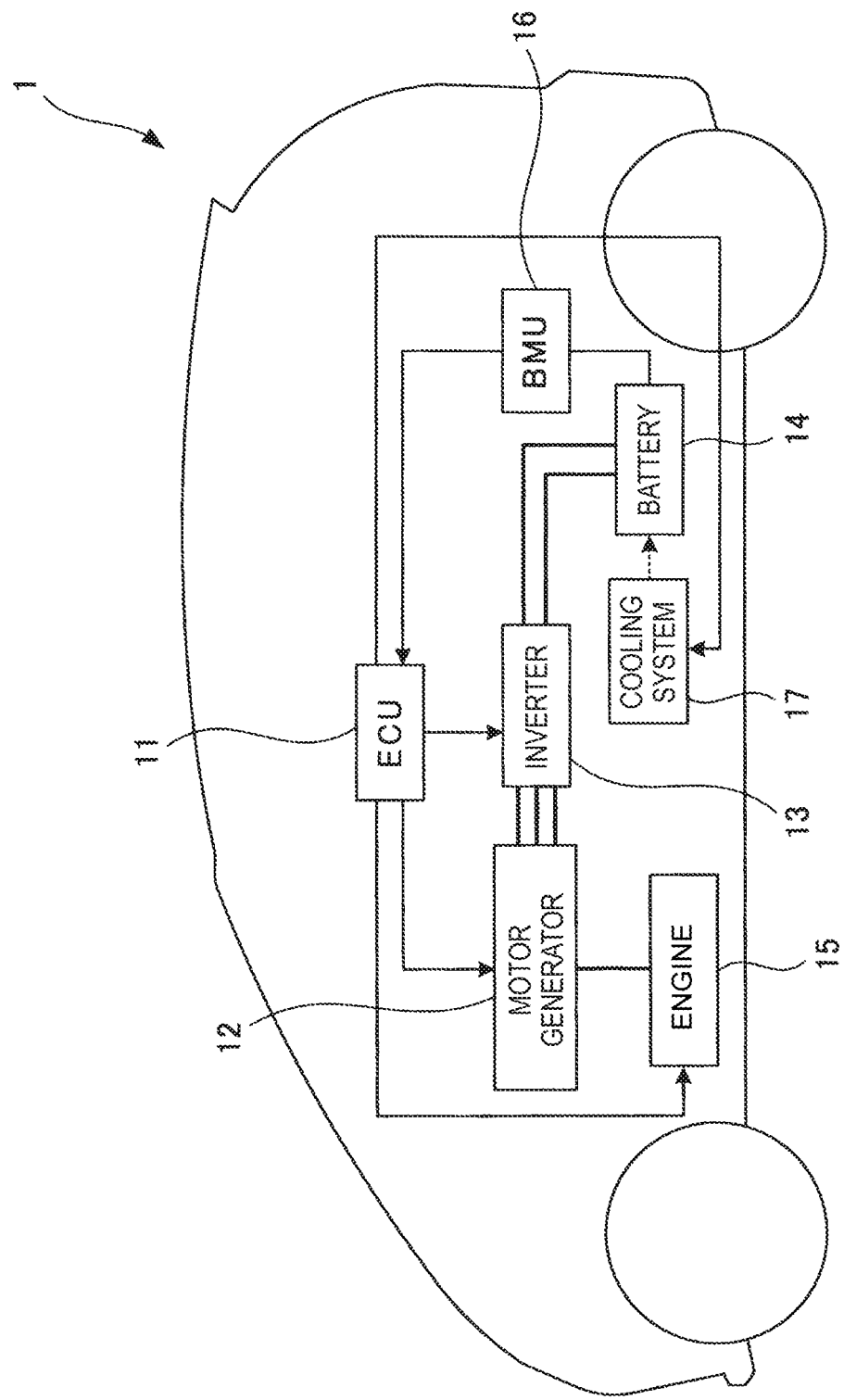
FIG. 1 is a block diagram for explaining a main configuration of a vehicle mounted with a battery cooling control device according to Embodiment 1 of the present invention.

FIG. 1 is a block diagram for explaining a main configuration of a vehicle mounted with a battery cooling control device according to Embodiment 1. As illustrated in FIG. 1, a vehicle 1 is mainly provided with an ECU (Electronic Control Unit: electronic control portion) 11, a motor generator (rotary electric machine) 12, an inverter 13, a battery (power storage device) 14, an engine (internal combustion engine) 15, a BMU (Battery Management Unit: power storage device management portion) 16, and a cooling system 17.

The ECU 11 grasps an operating state of the vehicle 1 based on information from various sensors provided in the vehicle 1, and generally controls various devices mounted on the vehicle 1 based on the grasped operating state. Incidentally, CAN (Controller Area Network) signals are, for example, used as input/output signals of the ECU 11. The CAN signals stand for signals to be transferred through communication lines connected to the ECU 11. In addition, the ECU 11 changes over a traveling mode of the vehicle 1 among various modes which will be described later.

The motor generator 12 is connected to the battery 14 through the inverter 13, and driven based on an instruction from the ECU 11 so as to supply and receive electric power to and from the battery 14. In addition, the motor generator 12 can output traveling power for the vehicle 1. Incidentally, a traveling mode where the vehicle 1 travels while stopping the engine 15 and operating the motor generator 12 is generally called an EV traveling mode.

The engine 15 operates based on an instruction from the ECU 11 so that the engine 15 can output traveling power for the vehicle 1. In a traveling mode generally called a parallel traveling mode, the vehicle 1 travels using the power of the engine 15 and the power of the motor generator 12.

In addition, in a traveling mode generally called a series traveling mode, the engine 15 operates to generate electric power, and the generated electric power is supplied to the motor generator 12, so that traveling of the vehicle 1 itself is performed only by the power of the motor generator 12 operated by the supplied electric power.

The parallel traveling mode and the series traveling mode in which the vehicle 1 travels while operating the engine 15 and the motor generator 12 as described above are collectively called an HEV traveling mode. The EV traveling mode and the HEV traveling mode (including the parallel traveling mode and the series traveling mode) described above can be changed over by the ECU 11.

The BMU 16 is connected to the ECU 11 and the battery 14, so as to detect and manage a temperature, a charging rate (hereinafter referred to as SOC (States Of Charge)), a voltage and a current of the battery 14, and transmits information thereof to the ECU 11.

The cooling system 17 is connected to the ECU 11, so as to cool the battery based on an instruction from the ECU 11.

In addition, in the ECU 11 according to the embodiment, a cooling start temperature where cooling the battery 14 should be started and a cooling stop temperature where cooling the battery 14 should be stopped are set in advance. Based on a detection result of the BMU 16, the ECU 11 outputs a cooling start instruction as soon as the temperature of the battery 14 reaches the cooling start temperature, and outputs a cooling stop instruction as soon as the temperature of the battery 14 reaches the cooling stop temperature.

The cooling system 17 starts cooling the battery 14 on receiving the cooling start instruction from the ECU 11, and stops cooling the battery 14 on receiving the cooling stop instruction from the ECU 11.

In addition, the ECU 11 changes set values of the cooling start temperature and the cooling stop temperature between the EV traveling mode and the HEV traveling mode. Specifically, the ECU 11 sets the set value of the cooling start temperature in the EV traveling mode to be higher than the set value of the cooling start temperature in the HEV traveling mode, and sets the set value of the cooling stop temperature in the EV traveling mode to be higher than or equal to the set value of the cooling stop temperature in the HEV traveling mode.

Further, the ECU 11 changes the set values of the cooling start temperature and the cooling stop temperature between the series traveling mode and the parallel traveling mode in the HEV traveling mode. Specifically, the ECU 11 sets the set values of the cooling start temperature and the cooling stop temperature in the series traveling mode to be higher than or equal to the set values in the parallel traveling mode respectively.

Figure 2:
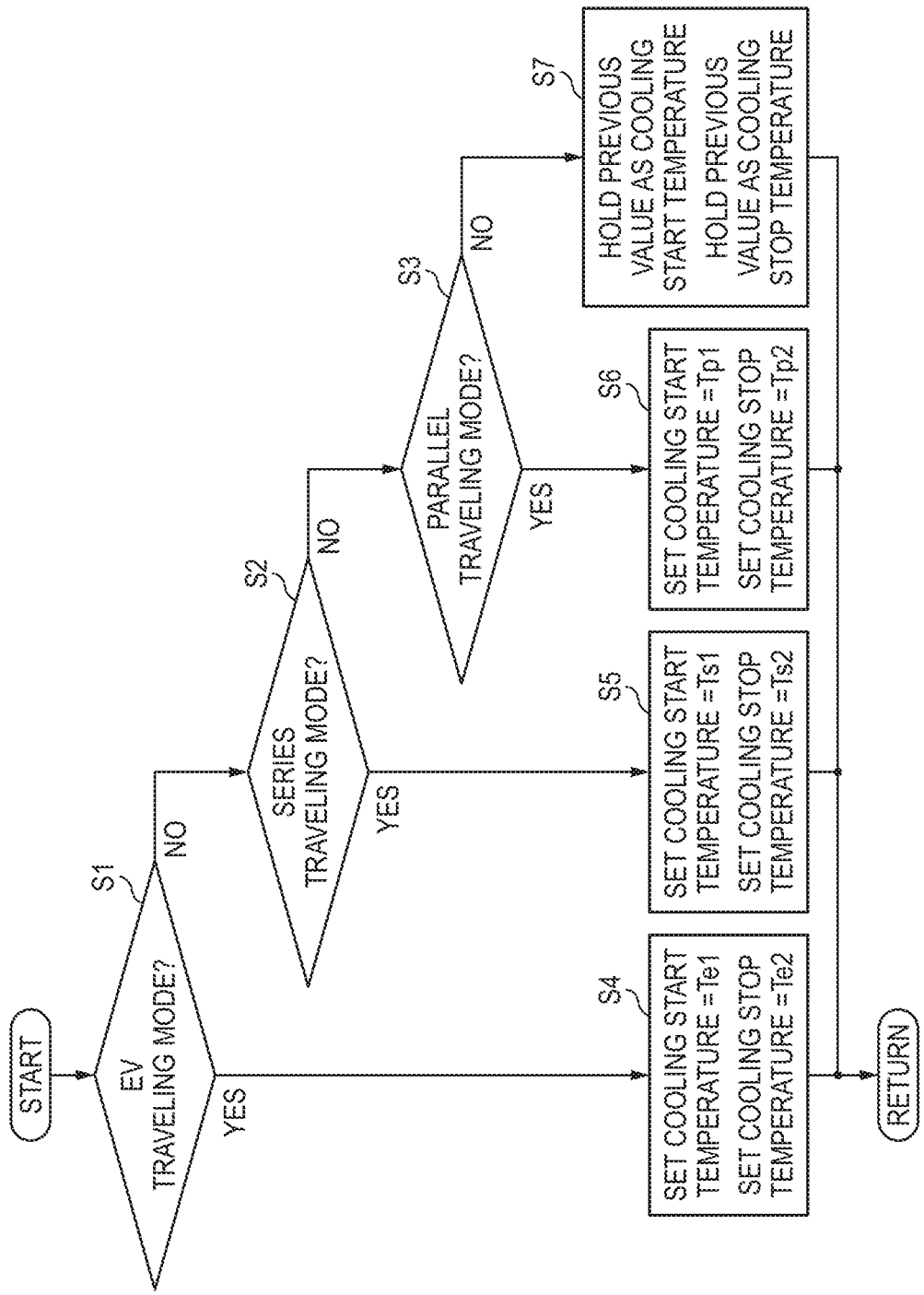
FIG. 2 is a flow chart for explaining a process in which each set temperature is determined by an ECU according to Embodiment 1 of the invention.

A process (operation) for the ECU 11 to determine the respective set temperatures will be specifically described below with reference to the flow chart of FIG. 2.

First, in Step S1, it is determined whether the vehicle 1 is traveling in the EV traveling mode or not. When the vehicle 1 is traveling in the EV traveling mode, the process moves to Step S4. Otherwise, the process moves to Step S2.

In Step S2, it is determined whether the vehicle 1 is traveling in the series traveling mode or not. When the vehicle 1 is traveling in the series traveling mode, the process moves to Step S5. Otherwise, the process moves to Step S5.

In Step S3, it is determined whether the vehicle 1 is traveling in the parallel traveling mode or not. When the vehicle 1 is traveling in the parallel traveling mode, the process moves to Step S6. Otherwise, the process moves to Step S7.

In Step 4, the cooling start temperature is set at Te1, and the cooling stop temperature is set at Te2.

In Step 5, the cooling start temperature is set at Ts1, and the cooling stop temperature is set at Ts2.

In Step 6, the cooling start temperature is set at Tp1, and the cooling stop temperature is set at Tp2.

In addition, as described previously, assume that the aforementioned cooling start temperatures satisfy Te1>Ts1≥Tp1, and the cooling stop temperatures satisfy Te2≥Ts2≥Tp2.

In Step S7, the values (previous values) of the cooling start temperature and the cooling stop temperature are held. This Step 7 assumes a transitional stage where the traveling mode is being changed over or a case where the traveling mode cannot be specified, such as a case where a communication apparatus is in failure.

The ECU 11 issues, to the cooling system 17, an instruction to start cooling the battery 14 and an instruction to stop cooling the battery 14, based on the cooling start temperature and the cooling stop temperature determined in Step S1 to S7.

That is, in the embodiment, the set values of the cooling start temperature and the cooling stop temperature for the battery 14 are changed in the ECU 11 in accordance with whether the vehicle 1 is traveling in the EV traveling mode, the series traveling mode or the parallel traveling mode.

The quantity of heat generated by the battery 14 is larger in the EV traveling mode than in the series traveling mode and in parallel traveling mode. When the cooling start temperature is set to be higher in the EV traveling mode than in the series traveling mode and in the parallel traveling mode, it is possible to prolong the EV traveling distance and time (without reducing the electricity efficiency).

In addition, since the temperature of the battery 14 is suppressed to be low in the series traveling mode and the parallel traveling mode, the temperature of the battery 14 can be prevented from being kept high in a long-distance drive, so as to suppress deterioration of the battery 14.

As described above, in the battery cooling control device according to the embodiment, it is possible to compatibly attain suppressing the deterioration of the battery and increasing the EV traveling distance (improving the electricity efficiency) of the vehicle.

Incidentally, in the embodiment, in a normal charging case in which the vehicle 1 is stopped to charge the battery 14, more powerful cooling may be performed than in a fast charging case (since a user wants to complete charging quickly in the fast charging case, powerful cooling is avoided to prevent the system from being operated for cooling to thereby increase the time to completion of charging).

Embodiment 2

In an ECU according to Embodiment 2, another function is added to the ECU 11 according to Embodiment 1. A process (operation) for the ECU according to Embodiment 2 to determine a cooling start temperature and a cooling stop temperature will be described below with reference to the flow chart of FIG. 3.

First, in Step S1, it is determined whether the vehicle 1 is traveling in the EV traveling mode or not, in the same manner as in Embodiment 1. When the vehicle 1 is traveling in the EV traveling mode, the process moves to Step S1a. Otherwise, the process moves to Step S2.

In Step S1a, based on the detection result of the SOC of the battery 14 by the BMU 16 described in Embodiment 1, it is determined whether the SOC of the battery 14 is higher than a predetermined value set in advance or not. When the SOC of the battery 14 is higher than the predetermined value, the process moves to Step S4. When the SOC of the battery 14 is equal to or lower than the predetermined value, the process moves to Step S4a.

In Step S4, the cooling start temperature is set at Te1, and the cooling stop temperature is set at Te2, in the same manner as in Embodiment 1.

In Step S4a, the cooling start temperature is set at Te3, and the cooling stop temperature is set at Te4.

Incidentally, the other steps are similar to those in Embodiment 1, and description thereof is omitted here.

Assume that the cooling start temperatures satisfy Te1>Te3≥Ts1≥Tp1, and the cooling stop temperatures satisfy Te2≥Te4≥Ts2≥Tp2 (see Embodiment 1 about the temperatures designated by Ts1, Ts2, Tp1 and Tp2).

Figure 3:
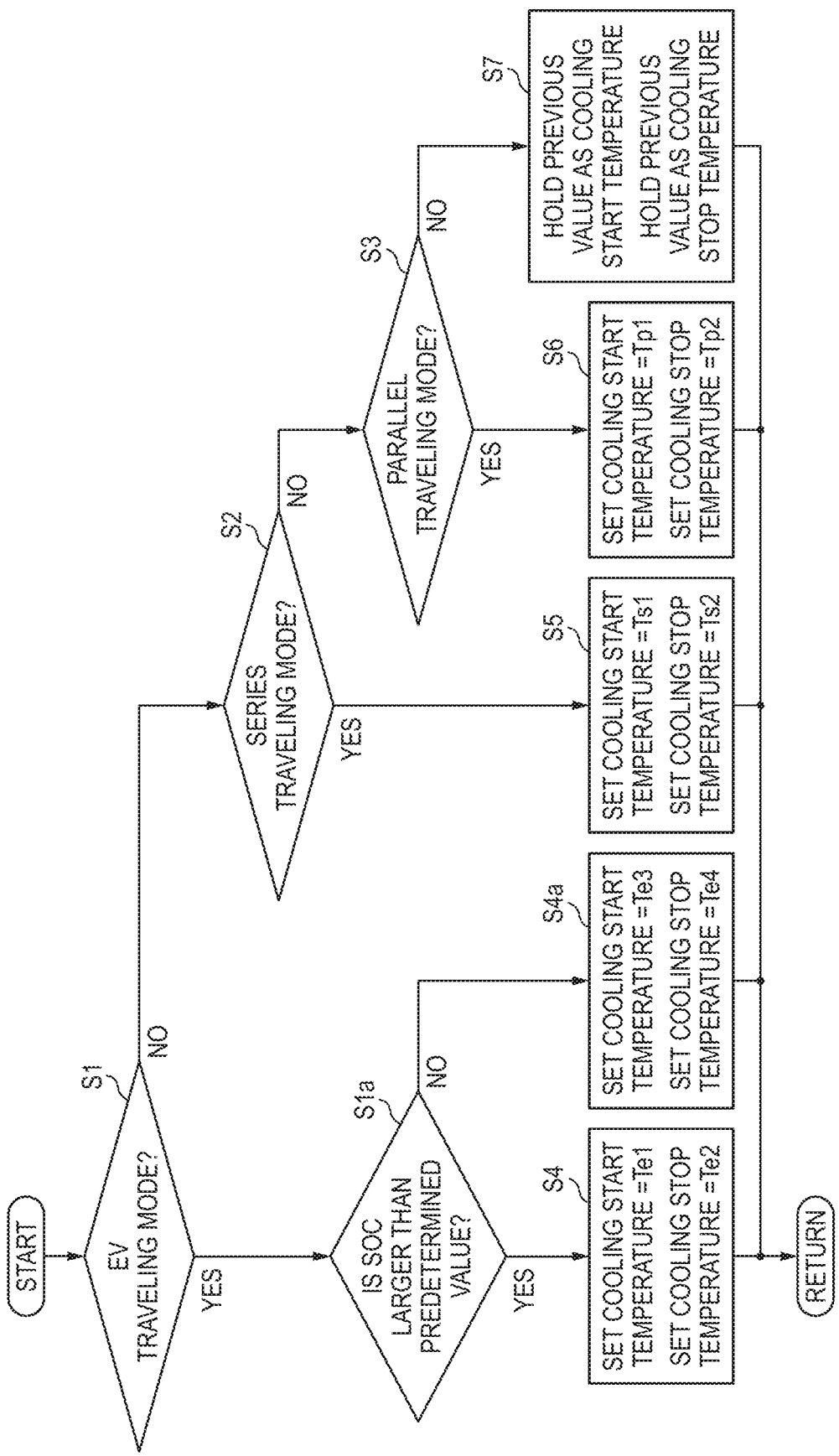
FIG. 3 is a flow chart for explaining a process in which each set temperature is determined by an ECU according to Embodiment 2 of the invention.

In addition, although in FIG. 3 the cooling start temperature and the cooling stop temperature are changed in accordance with the state of the SOC (Steps S1a, S4 and S4a) only when it is determined in Step S1 that the vehicle 1 is traveling in the EV traveling mode, the same processing may be performed when it is determined in Step S2 that the vehicle 1 is traveling in the series traveling mode and also further when it is determined in Step S3 that the vehicle 1 is traveling in the series traveling mode.

In this manner, the ECU according to the embodiment changes the set values of the cooling start temperature and the cooling stop temperature for the battery 14 in consideration of the SOC state of the battery 14 as well as in consideration of the traveling mode. Specifically, the set value of the cooling start temperature in a case where the SOC is higher than a predetermined value is set to be higher than the set value of the cooling start temperature in a case where the SCO is equal to or lower than the predetermined value, and the set value of the cooling stop temperature in the case where the SOC is higher than the predetermined value is set to be equal to or lower than the set value of the cooling stop temperature in the case where the SOC is equal to or lower than the predetermined value.

Incidentally, the set values of the cooling start temperature and the cooling stop temperature in the case where the SOC is equal to or lower than the predetermined value in the EV traveling mode are set to be higher than or equal to the set values of the cooling start temperature and the cooling stop temperature in the HEV traveling mode respectively (corresponding to the parts of Te3≥Ts1≥Tp1 and ≥Te4≥Ts2≥Tp2 in the aforementioned inequalities).

That is, the fact that the SOC is low means a state where the traveling mode will be changed over to a traveling mode using the engine soon in any case. Accordingly, increase or decrease in battery consumption at that time does not give great influence on the EV traveling distance as a whole. Therefore, in the embodiment, the influence reducing the EV traveling distance is ignored as long as the SOC is low, and cooling the battery is started early (at a low temperature) to suppress deterioration of the battery.

Incidentally, the aforementioned predetermined value may be set at a value half as high as a value in a full charged state, or may be changed desirably.

In the battery cooling control device according to the embodiment, the SOC state is taken into consideration as well as the traveling mode, so that it is more surely possible to compatibly attain suppressing the deterioration of the battery and increasing the EV traveling distance (improving the electricity efficiency).

The present invention is suitable as a battery cooling control device provided in an electrically driven vehicle having an engine and a motor.

What is claimed is:

1. A battery cooling control device which is provided in a vehicle including an internal combustion engine, a rotary electric machine for outputting traveling power, and a power storage device that supplies and receives electric power to and from the rotary electric machine, the battery cooling control device cooling the power storage device and comprising:

a power storage device management portion configured to detect a temperature of the power storage device;

an electronic control portion configured to change over a traveling mode of the vehicle between an EV traveling mode where the vehicle travels while stopping the internal combustion engine and operating the rotary electric machine and an HEV traveling mode where the vehicle travels while operating the internal combustion engine and the rotary electric machine, and based on a detection result of the power storage device management portion, output a cooling start instruction when the temperature of the power storage device reaches a predetermined cooling start temperature, and a cooling stop instruction when the temperature of the power storage device reaches a predetermined cooling stop temperature; and a cooling system configured to start cooling the power storage device in response to a receiving of the cooling start instruction and stop cooling the power storage device in response to a receiving of the cooling stop instruction; wherein:

the electronic control portion is configured to change set values of the cooling start temperature and the cooling stop temperature in accordance with whether the traveling mode is the EV traveling mode or the HEV traveling mode.

2. The battery cooling control device according to claim 1, wherein:

the electronic control portion is configured to set the cooling start temperature in the EV traveling mode to be higher than the cooling start temperature in the HEV traveling mode, and set the cooling stop temperature in the EV traveling mode to be higher than or equal to the cooling stop temperature in the HEV traveling mode.

3. The battery cooling control device according to claim 2, wherein:

the power storage device management portion is configured to detect a charging rate of the power storage device; and in the EV traveling mode, based on a detection result of the power storage device management portion, the electronic control portion is configured to set the cooling start temperature in a case where the charging rate is higher than a predetermined value to be higher than the cooling start temperature in a case where the charging rate is equal to or lower than the predetermined value, and set the cooling stop temperature in the case where the charging rate is higher than the predetermined value to be higher than or equal to the cooling stop temperature in the case where the charging rate is equal to or lower than the predetermined value.

4. The battery cooling control device according to claim 3, wherein:

the electronic control portion is configured to set the cooling start temperature in the EV traveling mode in the case where the charging rate is equal to or lower than the predetermined value to be higher than or equal to the cooling start temperature in the HEV traveling mode, and set the cooling stop temperature in the EV traveling mode in the case where the charging rate is equal to or lower than the predetermined value to be higher than or equal to the cooling stop temperature in the HEV traveling mode.

5. The battery cooling control device according to claim 1, wherein:

the HEV traveling mode includes a parallel traveling mode where the vehicle travels using power of the internal combustion engine and power of the rotary electric machine, and a series traveling mode where the vehicle travels while operating the rotary electric machine using electric power generated by the internal combustion engine; and the electronic control portion is configured to change over the traveling mode to the parallel traveling mode and the series traveling mode.

6. The battery cooling control device according to claim 5, wherein:

the electronic control portion is configured to set the cooling start temperature in the series traveling mode to be higher than or equal to the cooling start temperature in the parallel traveling mode, and sets the cooling stop temperature in the series traveling mode to be higher than or equal to the cooling stop temperature in the parallel traveling mode.

7. The battery cooling control device according to claim 5, wherein:

the power storage device management portion is configured to detect a charging rate of the power storage device; and in the series traveling mode, based on a detection result of the power storage device management portion, the electronic control portion is configured to set the cooling start temperature in a case where the charging rate is higher than a predetermined value to be higher than the cooling start temperature in a case where the charging rate is equal to or lower than the predetermined value, and set the cooling stop temperature in the case where the charging rate is higher than the predetermined value to be higher than or equal to the cooling stop temperature in the case where the charging rate is equal to or lower than the predetermined value.

8. The battery cooling control device according to claim 5, wherein:

the power storage device management portion is configured to detect a charging rate of the power storage device; and in the parallel traveling mode, based on a detection result of the power storage device management portion, the electronic control portion is configured to set the cooling start temperature in a case where the charging rate is higher than a predetermined value to be higher than the cooling start temperature in a case where the charging rate is equal to or lower than the predetermined value, and set the cooling stop temperature in the case where the charging rate is higher than the predetermined value to be higher than or equal to the cooling stop temperature in the case where the charging rate is equal to or lower than the predetermined value.

* * * * *